(12) United States Patent
ELKady et al.

(10) Patent No.: US 8,381,525 B2
(45) Date of Patent: Feb. 26, 2013

(54) SYSTEM AND METHOD USING LOW EMISSIONS GAS TURBINE CYCLE WITH PARTIAL AIR SEPARATION

(75) Inventors: Ahmed Mostafa ELKady, Niskayuna, NY (US); Narendra Digamber Joshi, Niskayuna, NY (US); Parag Prakash Kulkarni, Clifton Park, NY (US); Christian Lee Vandervort, Voorheesville, NY (US); Krishnakumar Venkatesan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 358 days.

(21) Appl. No.: 12/571,073

(22) Filed: Sep. 30, 2009

(65) Prior Publication Data
US 2011/0072779 A1 Mar. 31, 2011

(51) Int. Cl.
*F02C 1/00* (2006.01)
(52) U.S. Cl. .............................. 60/732; 60/39.12; 60/780
(58) Field of Classification Search ................. 60/39.15, 60/39.12, 733, 784, 732, 780
See application file for complete search history.

(56) References Cited

U.S. PATENT DOCUMENTS

| | | | |
|---|---|---|---|
| 3,798,898 A * | 3/1974 | Delahaye | 60/780 |
| 3,975,900 A | 8/1976 | Pfefferle | |
| 4,942,832 A | 7/1990 | Finke | |
| 5,950,417 A | 9/1999 | Robertson, Jr. et al. | |
| 7,322,198 B2 * | 1/2008 | Roby et al. | 60/776 |
| 7,395,670 B1 * | 7/2008 | Drnevich et al. | 60/780 |
| 7,513,100 B2 | 4/2009 | Motter et al. | |
| 2003/0152879 A1 * | 8/2003 | Fischer et al. | 431/8 |
| 2007/0220896 A1 * | 9/2007 | Varatharajan et al. | 60/772 |
| 2008/0115501 A1 | 5/2008 | Elkady et al. | |
| 2008/0141645 A1 * | 6/2008 | Evulet et al. | 60/39.12 |
| 2009/0025364 A1 * | 1/2009 | Darredeau | 60/39.15 |
| 2010/0326084 A1 * | 12/2010 | Anderson et al. | 60/775 |

* cited by examiner

*Primary Examiner* — Phutthiwat Wongwian
(74) *Attorney, Agent, or Firm* — Francis T. Coppa

(57) ABSTRACT

A system and method of reducing gas turbine nitric oxide emissions includes a first combustion stage configured to burn air vitiated with diluents to generate first combustion stage products. A second combustion stage is configured to burn the first combustion stage products in combination with enriched oxygen to generate second combustion stage products having a lower level of nitric oxide emissions than that achievable through combustion with vitiated air alone or through combustion staging alone.

5 Claims, 4 Drawing Sheets

SYSTEM AND METHOD USING LOW EMISSIONS GAS TURBINE CYCLE WITH PARTIAL AIR SEPARATION

BACKGROUND

This invention relates generally to gas turbine power plants, and more particularly, to a system and method for reducing gas turbine nitric oxide (NOx) emissions without incurring penalties associated with either combustion efficiency or carbon monoxide (CO) emissions.

Pollutant emissions from gas turbine power plants have been of great concern in the past several decades. Stringent regulations have been established to lower these emissions, especially nitric oxides to single digits. One of the solutions currently in use to reduce these NOx emissions employs selective catalytic reactors (SCR)s. Selective catalytic reactors undesirably are expensive, have a large footprint, and present additional concerns regarding ammonia slip.

Combustion with vitiated air is a proven technique for reducing NOx emissions by affecting the NOx kinetic mechanisms, changing the flame structure and lowering the peak flame temperature. Combustion staging has also been shown to reduce NOx emissions in applications including, for example, axial staging, late lean and sequential combustion systems (reheat).

It would be desirable to provide a system and method that further reduces NOx emissions below limits achievable using known techniques, without incurring penalties in terms of combustion efficiency or CO emissions.

BRIEF DESCRIPTION

Briefly, in accordance with one embodiment, a gas turbine combustion system comprises:
 a first combustion stage configured to burn air vitiated with diluents to generate first combustion stage products; and
 a second combustion stage configured to burn the first combustion stage products in combination with enriched oxygen to generate second combustion stage products having a lower level of nitric oxide emissions than that achievable through combustion with vitiated air alone or through combustion staging alone.

According to another embodiment, a method of reducing gas turbine nitric oxide emissions comprises:
 vitiating air with diluents;
 introducing the vitiated air to a first combustion stage of a gas turbine and generating first combustion stage combustion products therefrom;
 enriching the products of combustion from the first stage with oxygen in a second stage; and
 burning the products of combustion from the first stage in combination with enriched oxygen gas to generate second combustion stage products having a lower level of nitric oxide emissions than that achievable through combustion with vitiated air alone or through combustion staging alone.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

While the methods and apparatus are herein described in the context of a gas turbine engine used in an industrial environment, it is contemplated that the method and apparatus described herein may find utility in other combustion turbine systems applications including, without limitation, turbines installed in aircraft. Further, the principles and teachings set forth herein are applicable to gas turbine engines using a variety of combustible fuels such as, but not limited to, natural gas, gasoline, kerosene, diesel fuel, and jet fuel.

Figure 1:
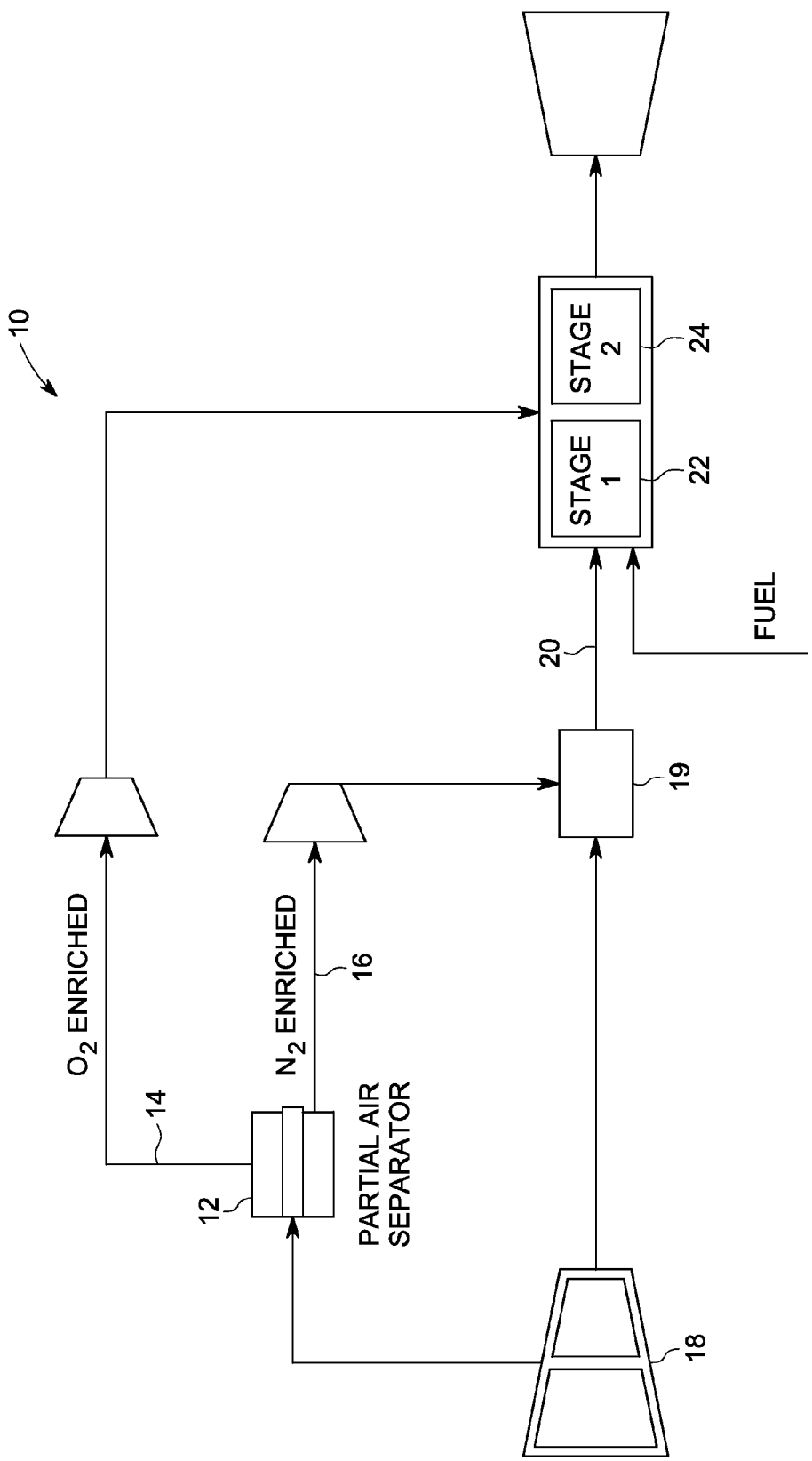
FIG. 1 is a simplified block diagram illustrating a low emissions simple gas turbine with partial air separation according to one embodiment.

FIG. 1 is a simplified block diagram illustrating a low emissions simple gas turbine system 10 with partial air separation, according to one embodiment. Gas turbine system 10 employs a partial air separator 12 that operates to separate compressed air supplied via an air compressor 18 into an oxygen enriched gas stream 14 and a nitrogen enriched gas stream 16. Input air is compressed via the air compressor 18; and the compressed air is supplied to the partial air separator 12.

Nitrogen enriched gas stream 16 is compressed and then mixed with compressed air from air compressor 18 to generate vitiated air via an air mixer 19. The resultant air 20 vitiated with diluents is transmitted to a first combustor stage 22 where it is burned and produces products of first stage combustion. Oxygen enriched gas stream 14 is compressed and mixed with the products of first stage combustion together in a second combustor stage 24. The present invention is not so limited however, and additional combustor stages beyond just two combustor stages can be employed in accordance with the principles described herein to achieve a desired NOx emissions level or to achieve other desired results.

Combining air vitiation and combustion staging as described above was found by the present inventors to reduce NOx emissions to very low limits that cannot be attained through either air vitiation alone or combustion staging alone. More particularly, this structure was found to provide a reliable technique for reducing NOx emissions to very low limits without incurring penalties in terms of combustion efficiency or CO emissions as applied to gas turbine systems that may employ either dry low emissions (DLN) combustors or dry low NOx combustors.

Figure 3:
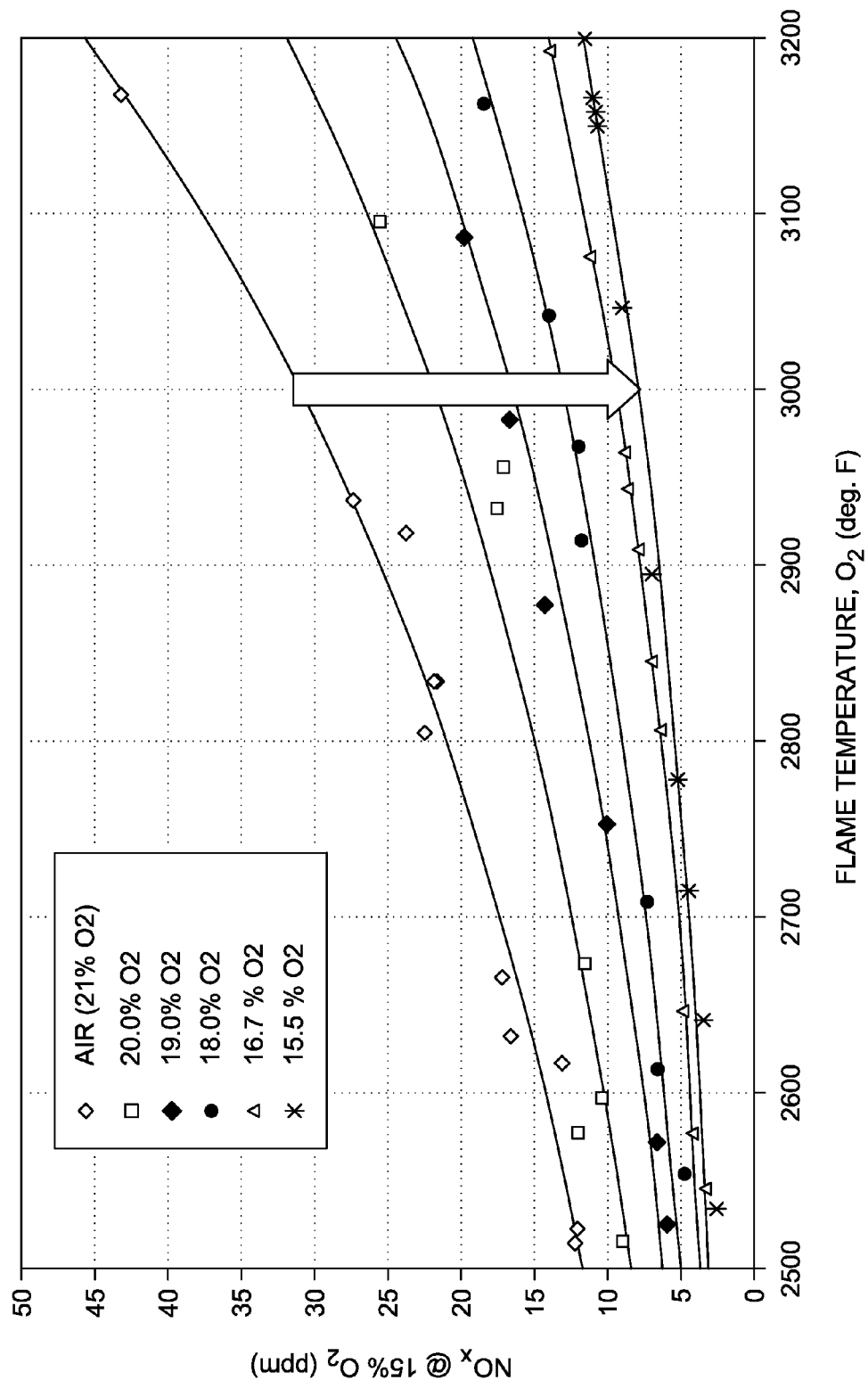
FIG. 3 is a graph illustrating NOx emissions reduction utilizing a DLE combustor system according to one embodiment.

FIG. 3 is a graph illustrating NOx emissions reduction utilizing the principles described herein utilizing DLE combustor system concepts.

Figure 4:
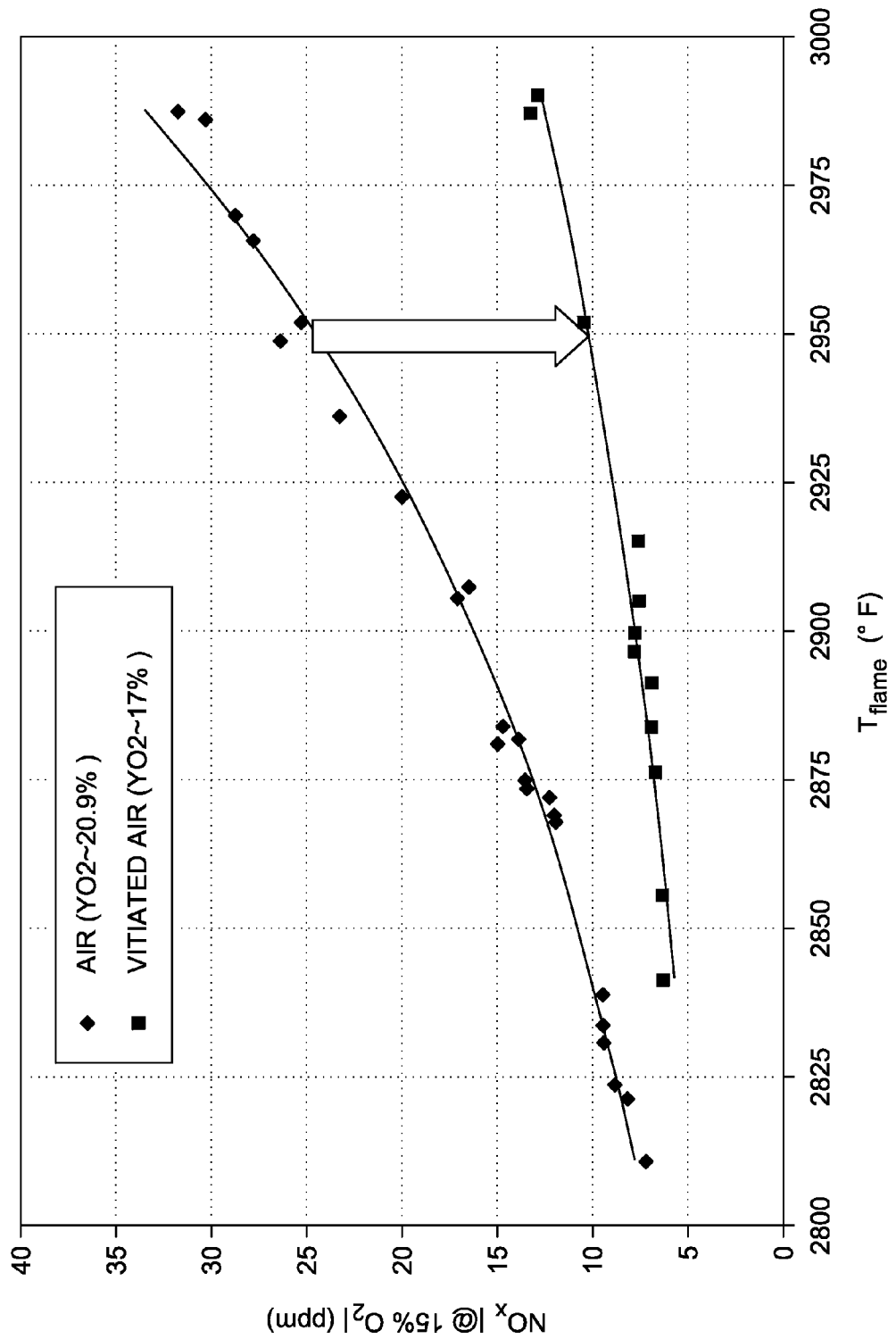
FIG. 4 is a graph illustrating NOx emissions reduction utilizing a DLN combustor system according to one embodiment.

FIG. 4 is a graph illustrating NOx emissions reduction utilizing the principles described herein utilizing DLN combustor system concepts.

It should be noted that oxygen enriched gas has not heretofore been injected into any stage of a conventional combustion staging process. This can be attributed to the necessity for careful management of combustion conditions to achieve stable operation, acceptable NOx and CO emissions while remaining free of pressure oscillations called dynamics usually related to the combination of acoustics and unsteady energy release of the combustion process.

DLN combustors particularly often require multiple independently controlled fuel injection points or fuel nozzles in each of one or more parallel identical combustors to allow gas turbine operation from start-up through full load. Further, DLN combustion systems often function well over a relatively narrow range of fuel injector pressure ratio, wherein this pressure ratio is a function of fuel flow rate, fuel passage flow area, and gas turbine cycle pressures before and after the fuel nozzles. Proper selection of fuel nozzle passage areas and regulation of the fuel flows to the several fuel nozzle groups are required to manage these pressure ratio limits. Correct fuel nozzle passage areas are based on actual fuel properties which are nominally assumed to be constant.

The present inventors alone discovered through experimentation, the effects of burning fuel with vitiated air (air mixed with diluents such as $N_2$ and $CO_2$ to reduce overall oxygen concentration) on gas turbine combustion performance and pollutant emissions, particularly in a gas turbine combustion system that combines a first combustion stage that burns air vitiated with diluents to generate first combustion stage products and one or more additional combustion stages configured to burn the first combustion stage products in combination with enriched oxygen to generate second or subsequent combustion stage products having a lower level of nitric oxide emissions than that achievable through combustion with vitiated air alone or through combustion staging alone.

Figure 2:
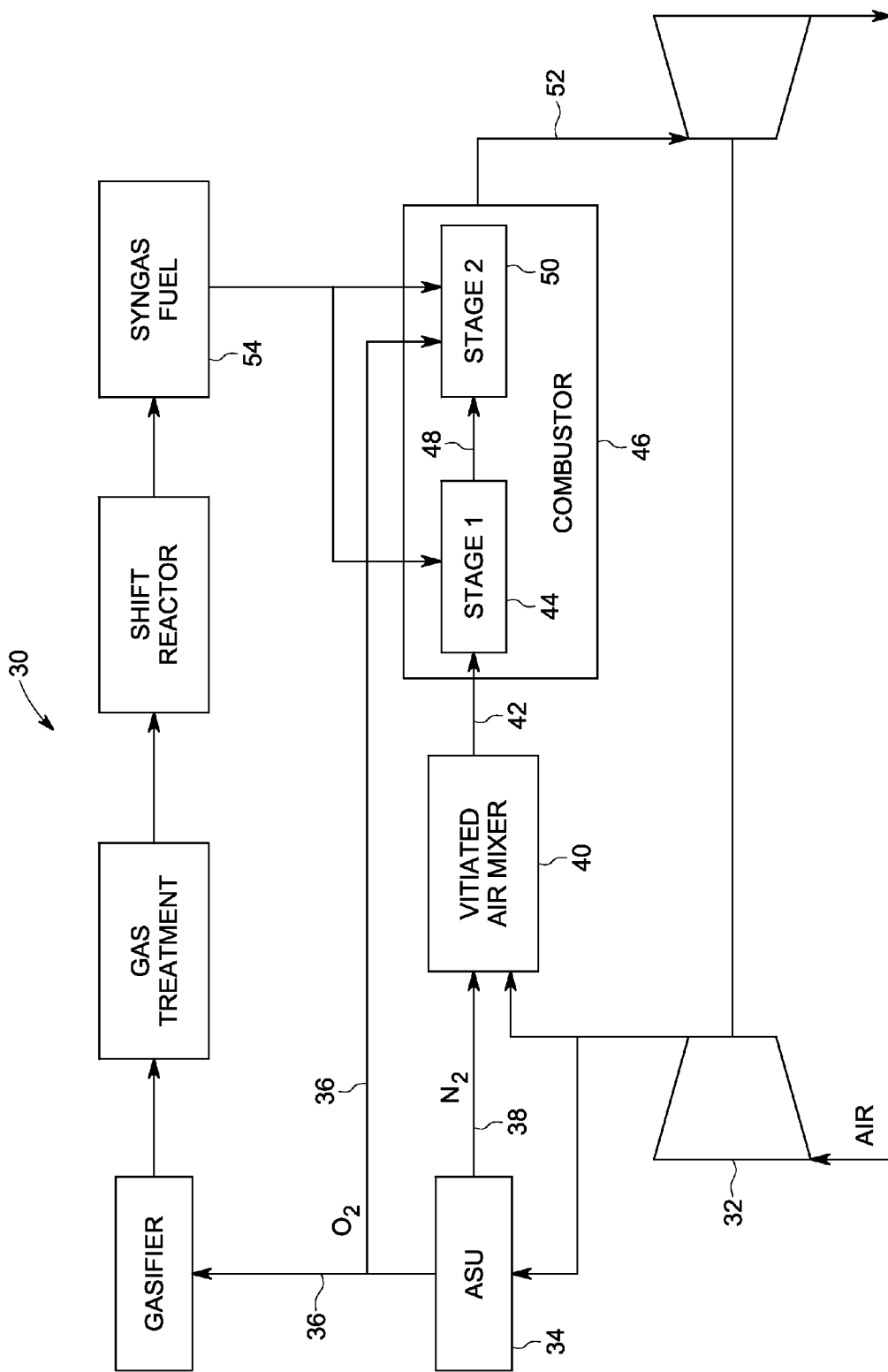
FIG. 2 is a simplified block diagram illustrating a low emissions simple gas turbine using an integral gasification combined cycle according to one embodiment.

One system and process for successfully lowering NOx emissions resulting from this experimentation is shown in FIG. 1, wherein an air stream enters a partial air separation unit that produces two outlet streams including an $N_2$ enriched stream (air vitiated) and an oxygen enriched stream. Another system and process, discussed in further detail below, for successfully lowering NOx emissions resulting from this experimentation is shown in FIG. 2. This system and process is useful in IGCC power plants where an air separation unit is in place and $N_2$ from an air separation unit (ASU) is mixed with the combustion air to result in a vitiated combustion air.

FIG. 2 is a simplified block diagram illustrating a low emissions simple gas turbine system 30 using an integral gasification combined cycle according to one embodiment. Air enters a compressor 32 where the air is compressed and transmitted to an air separation unit 34. The air separation unit 34 generates two gas streams including an oxygen enriched gas stream 36 and a nitrogen enriched gas stream 38. The nitrogen enriched gas stream 38 is mixed with the compressed air via an air mixer 40 to generate a vitiated air mixture 42. Vitiated air 42 is transmitted to a first stage 44 of a combustor 46 where it is burned in combination with a synthetic gas fuel 54 to generate first stage combustion products 48. These first stage combustion products 48 are transmitted to a second combustor stage 50 where the first stage combustion products 48 are mixed with the synthetic gas fuel 54 and enriched oxygen 36 and burned to yield very low NOx emissions combustion products 52. The principles and teachings set forth herein are applicable to gas turbine engines using a variety of combustible fuels such as, but not limited to, natural gas, gasoline, kerosene, diesel fuel, and jet fuel.

In summary explanation, a gas turbine system includes a first combustor stage configured to burn air vitiated with diluents to generate first combustion stage products, and a second combustor stage configured to burn the first stage combustion products in combination with enriched oxygen to generate second combustion stage products having nitric oxide emissions that are substantially lower than that achievable using air vitiation or combustion staging techniques alone. These reduced NOx emissions are obtained without penalties in combustion efficiency or CO emissions.

The embodiments described herein may advantageously eliminate the necessity for using selective catalytic reactors or otherwise reduce the size and cost of selective catalytic reactors due to using a combustor the produces lower NOx emissions than that achievable with conventional combustors. Further, combustion dynamics may be reduced via the embodiments described herein by adding another controlling parameter such as oxygen concentration. The embodiments described herein further provide a cost effective technique for achieving reduced NOx emissions without requiring add-on emissions system control equipment.

The embodiments described herein were found by the present inventors to be more effective at reducing NOx emissions than systems and methods that employ steam/water injection to a combustor or that utilize a dry low NOx combustion system with high premixedness efficiency.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A gas turbine combustion system comprising:
an air compressor;
an air separator fluidically coupled to the air compressor and configured to receive a first portion of compressed air from the air compressor and to generate an oxygen enriched gas and a nitrogen enriched gas therefrom;
an air mixer fluidically coupled to the air compressor to receive a second portion of the compressed air and fluidically coupled to the air separator to receive the nitrogen enriched gas to generate a vitiated air mixture therefrom; and
a multi-stage combustor comprising:
a first combustion stage fluidically coupled to the air mixer to receive the vitiated air mixture and fluidically coupled to a fuel source to receive fuel to generate first stage combustion products; and
a second combustion stage fluidically coupled to the air separator and configured to burn the first combustion stage products in combination with the oxygen enriched gas generated by and received from the air separator to generate second combustion stage products having a lower level of nitric oxide emissions than that achievable through combustion with vitiated air alone or through combustion staging alone.

2. The gas turbine combustion system according to claim 1, wherein the first and second combustion stages are integrated with a dry low emissions combustor.

3. The gas turbine combustion system according to claim 1, wherein the first and second combustion stages are integrated with a dry low nitric oxide combustor.

4. The gas turbine combustion system according to claim 1, wherein the lower level of nitric oxide is less than 10 parts per million of the second combustion stage products.

5. The gas turbine combustion system according to claim 1, wherein the second combustion stage products are generated while maintaining combustion efficiency and carbon monoxide emissions at levels achievable through combustion with vitiated air alone or through combustion staging alone.

* * * * *